United States Patent
Waßmer et al.

(10) Patent No.: US 11,325,926 B2
(45) Date of Patent: May 10, 2022

(54) VOC-FREE, AQUEOUS AND STORAGE-STABLE N-VINYLBENZYLAMINOALKYL-FUNCTIONAL SILOXANOL AND PROCESS FOR THE PRODUCTION THEREOF

(71) Applicant: Evonik Operations GmbH, Essen (DE)

(72) Inventors: Christian Waßmer, Hausen (DE); Tim Biggs, Rheinfelden (DE); Julian Asal, Rheinfelden (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/437,642

(22) PCT Filed: Mar. 10, 2020

(86) PCT No.: PCT/EP2020/056299
§ 371 (c)(1),
(2) Date: Sep. 9, 2021

(87) PCT Pub. No.: WO2020/182788
PCT Pub. Date: Sep. 17, 2020

(65) Prior Publication Data
US 2022/0041632 A1   Feb. 10, 2022

(30) Foreign Application Priority Data
Mar. 11, 2019 (EP) .................................. 19161860

(51) Int. Cl.
C08G 77/26 (2006.01)
C07F 7/18 (2006.01)
C09D 183/08 (2006.01)
C09J 183/08 (2006.01)

(52) U.S. Cl.
CPC .......... *C07F 7/1804* (2013.01); *C07F 7/1892* (2013.01); *C08G 77/26* (2013.01); *C09D 183/08* (2013.01); *C09J 183/08* (2013.01)

(58) Field of Classification Search
None
See application file for complete search history.

(56) References Cited

U.S. PATENT DOCUMENTS

| | | | |
|---|---|---|---|
| 4,246,145 A | 1/1981 | Molinier et al. | |
| 4,330,444 A | 5/1982 | Pollman | |
| 4,382,991 A | 5/1983 | Pollman | |
| 4,499,152 A | 2/1985 | Green et al. | |
| 4,849,294 A | 7/1989 | Plueddemann | |
| 4,902,556 A | 2/1990 | Benedikt et al. | |
| 5,037,868 A * | 8/1991 | Saito | H01B 3/441 524/93 |
| 5,221,431 A * | 6/1993 | Choe | C08J 5/06 216/34 |
| 5,358,572 A * | 10/1994 | Yeh | C08J 7/00 134/26 |
| 5,591,818 A | 1/1997 | Standke et al. | |
| 5,629,400 A * | 5/1997 | Standke | C09D 183/08 528/38 |
| 7,834,073 B2 * | 11/2010 | Standke | C07F 7/21 524/262 |
| 8,349,911 B2 * | 1/2013 | Kuehnle | C09D 183/04 522/172 |
| 9,624,378 B2 * | 4/2017 | Hippmann | C09D 5/035 |
| 2009/0186160 A1 * | 7/2009 | Timmons | C03C 17/30 427/427.5 |

FOREIGN PATENT DOCUMENTS

| | | | |
|---|---|---|---|
| CN | 101353480 | 1/2009 | |
| DE | 28 02 242 | 7/1978 | |
| EP | 0 176 062 | 4/1986 | |
| EP | 0 353 766 | 2/1990 | |
| EP | 451665 A1 * | 2/1991 | .......... D06M 13/285 |
| EP | 0 338 128 | 4/1993 | |
| EP | 0 590 270 | 5/1998 | |
| JP | H01-259369 | 10/1989 | |
| TW | 201305290 | 2/2013 | |
| WO | 2005/118599 | 12/2005 | |

OTHER PUBLICATIONS

Datasheet for Dow Corning Z-6032, 2 pages, no date provided. (Year: NONE).*
International Search Report issued in PCT/EP2020/056299 dated Apr. 1, 2020.
Written Opinion issued in PCT/EP2020/056299 dated Apr. 1, 2020.
Notification of Transmittal of the International Preliminary Report on Patentability dated Feb. 26, 2021.
European Search Report dated Jul. 19, 2019, in European Patent Application No. 19161860.2, 7 pages.

* cited by examiner

*Primary Examiner* — Robert S Loewe
(74) *Attorney, Agent, or Firm* — Grüneberg and Myers PLLC

(57) ABSTRACT

An aqueous, storage-stable and preferably colourless composition containing N-vinylbenzylaminoalkyl-functional siloxanols is derived from a reaction of hydrolysis products and optionally, condensation products of hydrolysis products, of at least one aminoalkyl-functional alkoxysilane or a mixture of aminoalkyl-functional alkoxysilanes with vinylbenzyl halide. The composition contains not less than 1% by weight of N-vinylbenzylaminoalkyl-functional siloxanols and/or salts of the protonated N-vinylbenzylaminoalkyl-functional siloxanols and water, based on the weight of the composition. The composition has a pH of 2 to 3.5. A process can be used for producing this composition.

20 Claims, No Drawings

VOC-FREE, AQUEOUS AND STORAGE-STABLE N-VINYLBENZYLAMINOALKYL-FUNCTIONAL SILOXANOL AND PROCESS FOR THE PRODUCTION THEREOF

CROSS-REFERENCE TO RELATED APPLICATIONS

This application is the National Stage entry under § 371 of International Application No. PCT/EP2020/056299, filed on Mar. 10, 2020, and which claims the benefit of European Application No, 19161860.2, filed on Mar. 11, 2019. The content of each of these applications is hereby incorporated by reference in its entirety.

BACKGROUND OF THE INVENTION

Field of the Invention

The present invention relates to an aqueous, storage-stable and preferably colourless composition comprising N-vinylbenzylaminoalkyl-functional siloxanols derived from a reaction of hydrolysis products and optionally condensation products of hydrolysis products of at least one aminoalkyl-functional alkoxysilane or a mixture of aminoalkyl-functional alkoxysilanes with vinylbenzyl halide comprising not less than 1% by weight of N-vinylbenzylaminoalkyl-functional siloxanols and/or salts of the protonated N-vinylbenzylaminoalkyl-functional siloxanols and water, wherein the total composition sums to 100% by weight and has a pH of 2 to 3.5. A process for producing this composition is likewise disclosed.

Description of Related Art

The production of hydrochloride-functionalized aminosilanes, for example of 3-(N-vinylbenzyl-2-aminoethyl)aminopropyltrimethoxysilane as a methanolic solution, and the use thereof for example as adhesion promoters have long been known (U.S. Pat. No. 4,902,556, EP 353 766, U.S. Pat. No. 4,849,294, EP 338 128, U.S. Pat. Nos. 4,499,152, 4,382,991, 4,330,444, DE 28 02 242, JP 01-259369, EP 176 062, EP 590 270, WO 2005/118599, to name just a few).

However, VOC (volatile organic compounds)-free products are increasingly demanded for many applications. VOCs are generally undesired for many reasons such as environmental impact and work safety reasons. The reaction product of vinylbenzyl chloride (VBC) with N-(2-aminoethyl)-3-aminopropyltrimethoxysilane (DAMO) for producing a 3-(N-vinylbenzyl-2-aminoethyl)aminopropyltrimethoxysilane hydrochloride is in industrial practice obtained only as a solution in a solvent. Methanol is often employed as solvent. This methanolic solution is for example used as an adhesion promoter between glass fibre and epoxy resin (in PCBs, printed circuit boards). Application onto the glass fibre is usually in the form of an aqueous size (also referred to as sizing agent in the art). The reaction product in methanol is first hydrolysed in water and the stability of this hydrolysate lasts a maximum of 48 h.

The customary usage recommendation for 3-(N-vinylbenzyl-2-aminoethyl)aminopropyltrimethoxysilane thus only provides for producing aqueous compositions having a content of not more than 0.1% to 0.5% by weight of 3-(N-vinylbenzyl-2-aminoethyl)aminopropyltrimethoxysilane since otherwise a multiphase composition comprising an oily phase as a sediment is formed within a few days. The composition additionally contains the hydrolysis alcohol.

SUMMARY OF THE INVENTION

The present invention accordingly has for its object to provide a storage-stable, VOC-free aqueous composition of the N-vinylbenzylaminoalkyl-functional silane, wherein the composition should moreover not form multiphase mixtures over a relatively long period and the viscosity, an indicator of stability, should preferably not change substantially over this period. It was a further object to provide a process for producing these compositions. The stability of a composition in aqueous dilution (as a ready to use size, e.g. as sizing agent for glass fibres) should be more than 24 h or ideally more than 48 h. Such aqueous dilutions typically have a solids content (measured in accordance with DIN ISO 3251) ranging from 0.5 to 10 wt-%, based on the composition.

The objects are achieved by the described composition and the described process, and further preferred embodiments are elucidated in the description.

It has been found that, surprisingly, a storage-stable (at least 6 months at room temperature) aqueous VOC-free (free from volatile organic compounds) reaction product of N-(2-aminoethyl)-3-aminopropyltrimethoxysilane and vinylbenzyl chloride is obtained when the employed N-(2-aminoethyl)-3-aminopropyltrimethoxysilane is hydrolysed with water before the reaction with vinylbenzyl chloride and subsequently after neutralization and preferably adjustment to an acidic pH the alcohol, here the methanol, is removed by distillation. The distillation is preferably carried out under vacuum at a bottoms temperature of less than 60° C. This makes it possible to advantageously provide a composition, in particular a solution, having an alcohol content (such as methanol, ethanol and propanol), in particular a methanol content, of <1.0% by weight and a storage stability of more than 6 months at room temperature (20 to 23° C.). The stability as an aqueous dilution (use as a size) is also more than 1 month at room temperature (20 to 23° C.). A solution is to be understood as meaning a homogeneous mixture of water and the amino-functional siloxanols according to the invention which are present as only a single phase.

The present invention accordingly provides a composition comprising N-vinylbenzylaminoalkyl-functional siloxanols and optionally salts of the protonated N-vinylbenzylaminoalkyl-functional siloxanols, in particular a composition containing 3-(N-vinylbenzyl-2-aminoethyl)aminopropyltrimethoxysiloxane hydrochloride and water—also referred to hereinbelow as the solution according to the invention for short—and also the process for the production thereof and the use thereof.

DETAILED DESCRIPTION OF THE INVENTION

The invention provides an aqueous composition comprising N-vinylbenzylaminoalkyl-functional siloxanols and optionally salts of the protonated N-vinylbenzylaminoalkyl-functional siloxanols and optionally mixtures thereof which are derived from a reaction of hydrolysis products and optionally condensation products of hydrolysis products of at least one aminoalkyl-functional alkoxysilane or a mixture of aminoalkyl-functional alkoxysilanes with
vinylbenzyl halide, wherein the composition comprises
1% to 70% by weight of N-vinylbenzylaminoalkyl-functional siloxanols and optionally salts of the protonated N-vinylbenzylaminoalkyl-functional siloxanols,
30% to 99% by weight of water based on the total composition of 100% by weight with an acidic pH, in particular a pH of less than 7.0, preferably a pH of 2 to 3.5.

It is particularly preferable when the content of the N-vinylbenzylaminoalkyl-functional siloxanols and/or the salts of the protonated N-vinylbenzylaminoalkyl-functional siloxanols is from 10% to 65% by weight, preferably from 20% to 60% by weight and particularly preferably from 30% to 60% by weight in the aqueous composition, in particular with 35% to 90% by weight of water, preferably with 40% to 80% by weight of water, particularly preferably with 40% to 70% by weight of water. The aqueous composition is preferably in the form of an aqueous solution having a pH of 2 to 3.75. Very particularly preferred compositions have a content of 40% to 65% by weight of N-vinylbenzylaminoalkyl-functional siloxanols and/or the salts of the protonated N-vinylbenzylaminoalkyl-functional siloxanols and mixtures thereof, preferably the content is 35% to 50% by weight, particularly preferably 35% to 45% by weight, in particular with 50% to 65% by weight of water, preferably with 55% to 65% by weight of water, wherein the pH of the aqueous composition is preferably 2.7 to 4, particularly preferably 2.7 to 3.75, preferably 2.85 to 3.5. A pH of 3 plus/minus 0.5, plus/minus 0.25, is alternatively preferred. The content of the acidic composition of the N-vinylbenzylaminoalkyl-functional siloxanols and/or of the salts of the protonated N-vinylbenzylaminoalkyl-functional siloxanols may be determined through determination of the solids content. Very particular preference is given to a content of not less than 25% to 65% by weight of N-vinylbenzylaminoalkyl-functional siloxanols and/or the salts of the protonated N-vinylbenzylaminoalkyl-functional siloxanols, wherein the content of water is not more than 75% to 35% by weight in the total composition of 100% by weight.

In a particularly preferred embodiment the invention provides a composition having i) a pH of less than 7.0, in particular a pH of 2 to 3.5. The composition may likewise contain a content of acid or dissociated ions thereof for forming the protonated N-vinylbenzylaminoalkyl-functional siloxanols with anion selected from inorganic or organic acid or mixtures thereof. The acid is preferably added in a ratio of 0.5 mol to 1.0 mol based on the nitrogen atoms in the silane or siloxane.

In one embodiment the invention provides a composition comprising per mol of nitrogen atoms 0.2 to 1.5 mol of protons (hydrons) in the total composition, in particular 0.45 to 1.15 mol of protons (hydrons). The composition may further comprise per mol of nitrogen atoms of the siloxanols 0.2 to 1.5 mol of protons (hydrons) and 0.2 to 1.5 mol of anions, preferably 0.45 to 1.15 mol of anions, in particular of the halides and optionally of the acid, in the total composition.

Preferred acids include hydrochloric acid and carboxylic acids. The acid is more preferably selected from hydrochloric acid, formic acid, acetic acid, oxalic acid and fumaric acid. Water-soluble acids having a solubility in water of more than 5 g/100 g, for example, are suitable in principle. Likewise suitable are sulfuric acid, alkylcarboxylic acids having 1 to 5 carbon atoms, lactic acid, fruit acids, fatty acids, acrylic acid, methacrylic acid and/or olefinic acids.

The sequence in which the pH adjustment and the removal of the alcohol and of the hydrolysis alcohol are carried out is crucial to the production of storage-stable solutions. According to the invention the pH is first adjusted to a neutral and preferably acidic value through addition of an acid or a mixture of acids after reaction of the hydrolysis products and optionally condensation products of the aminoalkyl-functional alkoxysilanes or their mixtures with vinylbenzyl halide. The resulting composition may then be diluted with water and preferably 1 to 100 times the amount of water employed for the hydrolysis is added, preferably 10 to 30 times the amount of water is added, and the alcohol and hydrolysis alcohol are removed from the composition by distillation at reduced pressure (vacuum), preferably at less than 300 mbar (abs.), in particular at 100 to 250 mbar (abs.), at a bottoms temperature of 20 to 65° C., especially 35 to 60° C., and optionally further water, preferably 0.5 to 100 times the amount of water used for the hydrolysis, preferably 0.5 to 10 times the amount of water, is added and the aqueous composition is obtained.

It has been found that the storage-stable, aqueous solutions exhibit a defined viscosity on account of a defined molecular weight of the obtained N-vinylbenzylaminoalkyl-functional siloxanols and/or the salts of the protonated N-vinylbenzylaminoalkyl-functional siloxanols and optionally the mixtures thereof. Without wishing to be bound to this theory it is thought that the siloxanols functionalized with vinylbenzyl in accordance with the invention form micelle-like structures and thus increase storage stability.

Determination of molecular weights may be carried out by methods familiar to those skilled in the art, such as GPC determination for establishing the molecular weight of oligomeric or polymeric structures. Various methods of GPC determination are known. Thus in triplicate detection the arithmetic average (Mn=number average molecular weight), the weight average molecular weight (Mw=weight average molecular weight) or an average which disproportionately accounts for the weight of the molecules (Mz=centrifuge average molecular weight) is determined. The peak molecular weight may likewise be reported (Mp=peak molecular weight).

Weight average molecular weight (Mw)

$$M_w = \frac{\sum n_i M_i^2}{\sum n_i M_i}$$

and number average molecular weight (Mn)

$$M_n = \frac{\sum n_i M_i}{\sum n_i}$$

where in each case:
$n_i$=amount of substance [mass] of the i-mer
$M_i$=molar mass of the i-mer Details of the definition of weight average and number average, which are known per se to the skilled person, may also be found inter alia at http://de.wikipedia.org/wiki/Molmassenverteilung or in a standard mathematics text.

Preference is given to an aqueous composition in which the weight average molecular weight (Mw) of the N-vinylbenzylaminoalkyl-functional siloxanols and/or the salts of the protonated N-vinylbenzylaminoalkyl-functional siloxanols is not less than 1000 g/mol and/or the number average molecular weight (Mn) of the N-vinylbenzylaminoalkyl-functional siloxanols and/or the salts of the protonated N-vinylbenzylaminoalkyl-functional siloxanols is not less than 700 g/mol, in particular the weight average molecular weight (Mw) is not less than 10 000 g/mol and/or the number average molecular weight (Mn) is not less than 800 g/mol, preferably not less than 1500 g/mol.

According to an alternative of the invention it is preferable when the composition contains N-vinylbenzylaminoalkyl-functional siloxanols and/or the salts of the protonated N-vinylbenzylaminoalkyl-functional siloxanols or mixtures thereof whose weight average molecular weight (Mw) is not less than 1000 g/mol and whose number average molecular weight (Mn) is not less than 700 g/mol, wherein the polydispersity, i.e. the quotient of Mw/Mn, is 1.0 to 10, preferably 1.05 to 6, in selected alternatives 1.05 to 2.5 or 3.5 to 6.

Also preferred are compositions comprising N-vinylbenzylaminoalkyl-functional siloxanols and/or the salts of the protonated N-vinylbenzylaminoalkyl-functional siloxanols or mixtures thereof in which the weight average molecular weight (Mw) is not less than 10 000 g/mol and the number average molecular weight (Mn) is not less than 800 g/mol, wherein the polydispersity, i.e. the quotient of Mw/Mn, is 1.05 to 10, preferably 1.05 to 2.5, alternatively preferably 3.5 to 6. Likewise preferred compositions contain these siloxane oligomers whose weight average molecular weight (Mw) is not less than 10 000 g/mol and whose number average molecular weight (Mn) is not less than 1500 g/mol, wherein the polydispersity (D), i.e. the quotient of Mw/Mn, is optionally 3.5 to 6.

The invention accordingly also provides compositions in which the weight average molecular weight (Mw) of the N-vinylbenzylaminoalkyl-functional siloxanols and/or the salts of the protonated N-vinylbenzylaminoalkyl-functional siloxanols is not less than 1000 g/mol and not more than 100 000 g/mol, in particular not less than 1000 g/mol and not more than 10 000 g/mol and/or the number average molecular weight (Mn) of the N-vinylbenzylaminoalkyl-functional siloxanols and/or the salts of the protonated N-vinylbenzylaminoalkyl-functional siloxanols is not less than 700 g/mol and not more than 100 000 g/mol, preferably not less than 700 g/mol and not more than 10 000 g/mol. According to one alternative the weight average molecular weight (Mw) may be not less than 10 000 g/mol and not more than 50 000 g/mol and/or the number average molecular weight (Mn) may be not less than 800 g/mol, preferably not less than 1500 g/mol and not more than 50 000 g/mol.

Preference is given to a composition whose N-vinylbenzylaminoalkyl-functional siloxanols and/or salts of the protonated N-vinylbenzylaminoalkyl-functional siloxanols are completely hydrolysed; in particular the content of alkoxy groups is less than 0.1% by weight based on the siloxanols, preferably less than 0.01% by weight.

In an alternative preferred embodiment, the viscosity of the aqueous compositions is 1 to 500 [mPas, at 20° C.], in particular 10 to 400 [mPas, at 20° C.], preferably 50 to 350 [mPas, at 20° C.]. It is further preferable when after storage at 60° C. over 21 days the viscosity of the aqueous composition, in particular having a content of N-vinylbenzylaminoalkyl-functional siloxanols and/or salts of the protonated N-vinylbenzylaminoalkyl-functional siloxanols of 20% to 60% by weight, preferably of 30% to 40% by weight, measured at 20° C., is in the range from 50 to 500 [mPas, at 20° C.], preferably in the range from 100 to 350 [mPas, at 20° C.]. The viscosity may be determined according to DIN53015.

Particularly preferred aqueous compositions have a content of
i) free alcohol in the total composition of not more than 0.5% by weight, in particular less than 0.25% by weight, and particularly preferably of not more than 0.1% by weight based on the total composition and optionally the content of
ii) hydrolysable alkoxy groups is less than 5% by weight, preferably not more than 1.0% by weight, particularly preferably not more than 0.5% by weight, preferably not more than 0.1% by weight, or preferably not more than 0.01% by weight in the total composition.

It is preferable when the aqueous composition is substantially free from organic diluents and upon crosslinking releases substantially no more alcohol; in particular the composition comprises essentially only water, water-soluble N-vinylbenzylaminoalkyl-functional siloxanols and/or salts of the protonated N-vinylbenzylaminoalkyl-functional siloxanols or mixtures thereof and optionally at least one acid or hydrolysed products thereof.

The aqueous composition is preferably free of 3,5-di-tert-butylcatechol, 2,5-di-tert-butylhydroquinone, 4-tert-butylpyrocatechol, 2,4-di-tert-butylphenol, hydroquinone monomethyl ether, and 2,6-di-tert-butyl-p-cresol. Said compounds are used as stabilizers of alcoholic solutions and are thus not necessary in case of the present invention.

Suitable aminoalkyl-functional alkoxysilanes for producing the composition may correspond to formula I

$(R^1O)_{3-a-b}(R^2)_a Si(B)_{1-b}$     (1)

and group B in formula I independently corresponds to a group of formula II

$-(CH_2)_c-[(NH)(CH_2)_d]_e[(NH)(CH_2)_f]_g NH_{(2-h)} R^3{}_h$     (II)

in formula I $R^1$ independently represents a linear, branched or cyclic alkyl group having 1 to 8 carbon atoms, in particular having 1, 2, 3 or 4 carbon atoms, $R^2$ independently represents a linear, branched or cyclic alkyl group having 1 to 8 carbon atoms and $R^3$ in formula II independently represents a linear, branched or cyclic alkyl, aryl or alkylaryl group having 1 to 8 carbon atoms; and in formula I a is independently 0 or 1, b is independently 0, 1 or 2, preferably 0; in formula II c is independently selected from 1, 2, 3, 4, 5 and 6; d is independently selected from 1, 2, 3, 4, 5 and 6; e is independently selected from 0, 1, 2, 3, 4, 5 and 6; f is independently selected from 1, 2, 3, 4, 5 and 6; g is independently selected from 0, 1, 2, 3, 4, 5 and 6; and h is independently 0 or 1; or group B in formula I corresponds to a group of formula III

$-(CH_2)_j-NH_{2-p}(CH_2-CH_2-NH_2)_p$     (III)

where j=1, 2 or 3 and p=0, 1 or 2; p is preferably selected from 0 and 1.

Particular preference is given to aminoalkyl-functional alkoxysilanes of formula I, in particular where $R_1O-$ is alkoxy selected from methoxy- and ethoxy- and a=0 and b=b,

$(R^1O)_{3-a-b}(R^2)_a Si(B)_{1+b}$     (I)

wherein group B in formula I corresponds to the group of formula III

$-(CH_2)_3-NH-CH_2-CH_2-NH_2$     (III)

where a is independently 0 or 1, b is independently 0, 1 or 2, preferably b is 0, preferably where a=0 and b=0 or 1, in particular where b=0.

It is generally preferable when the aminoalkyl-functional alkoxysilane corresponds to a diaminoalkyl-functional or a triaminoalkyl-functional alkoxysilane of formula I. Likewise particularly preferred are mixtures of the aforementioned silanes, such as aminosilane with diaminosilane or else aminosilane with triaminosilane or diaminosilane with triaminosilane, or else mixtures comprising three or more different aminosilanes of formula I.

The invention likewise provides a process and in particular a composition obtainable by the process and the process for producing the composition comprising the steps of
   initially charging at least one aminoalkyl-functional alkoxysilane or a mixture of aminoalkyl-functional alkoxysilanes, optionally as an alcoholic composition,
   adding 0.5 to 4.5 mol of water/mol of silicon atoms of the amino-functional alkoxysilanes, in particular 1.0 to 3.5 mol of water/mol of silicon atoms, preferably 1.5 to 3.0 mol of water/mol of silicon atoms, in particular plus/minus 0.15 mol in each case,
   optionally maintaining the temperature in the range from 40 to 65° C. with mixing,
   obtaining a composition comprising hydrolysis products and optionally condensation products of the hydrolysis products of the at least one aminoalkyl-functional alkoxysilane and hydrolysis alcohol,
   reacting the hydrolysis products and optionally the condensation products of the hydrolysis products with vinylbenzyl halide, in particular vinylbenzyl chloride, wherein the vinylbenzyl halide is added in a molar ratio of 1.0:0.60 to 1.0:1.15 based on the aminoalkyl-functional alkoxysilanes or the mixture of aminoalkyl-functional alkoxysilanes, preferably in a molar ratio of 1:0.99 to 1.01, and optionally
   adding the vinyl halide, in particular at a temperature in the range from 40 to 60° C., and preferably reacting in this temperature range,
   obtaining a composition of N-vinylbenzylaminoalkyl-functional siloxanols and optionally salts of the protonated N-vinylbenzylaminoalkyl-functional siloxanols,
   adjusting the pH of the composition by adding acid selected from inorganic or organic acid or mixtures thereof, in particular to a pH of less than 7.0,
   adding water, in particular distilled water, and
   removing the alcohol and optionally the hydrolysis alcohol and
   obtaining an aqueous composition comprising N-vinylbenzylaminoalkyl-functional siloxanols and optionally salts of the protonated N-vinylbenzylaminoalkyl-functional siloxanols with an acidic pH.

The abovementioned molar ratio of vinylbenzyl halide is based on alkoxysilanes.

In alternative process variants it is also possible to adjust the pH to neutral or acidic by addition of acid before the addition of the vinyl halide and then add the vinyl halide.

At least one aminoalkyl-functional alkoxysilane or a mixture of aminoalkyl-functional alkoxysilanes is preferably initially charged as an alcoholic composition by initially charging or producing at least one aminoalkyl-functional alkoxysilane or a mixture of aminoalkyl-functional alkoxysilanes as an alcoholic composition having a weight ratio of amino-functional alkoxysilane to alcohol, in particular ethanol or methanol, of 80:20 to 30:70.

After obtaining a composition of N-vinylbenzylaminoalkyl-functional siloxanols and optionally salts of the protonated N-vinylbenzylaminoalkyl-functional siloxanols the pH of the composition is preferably adjusted by first setting the bottoms temperature to 0° C. to 40° C., in particular to 0° C. to 30° C., preferably to below 25° C. and then adjusting the pH by addition of an acid selected from inorganic or organic acid or mixtures thereof, wherein the bottoms temperature preferably does not exceed 60° C., in particular does not exceed 40° C.

In a preferred alternative the respective step:
   adding water comprises adding a defined amount of water, in particular distilled water, and
   removing the alcohol and the hydrolysis alcohol comprises a distillative removal of the alcohol and the hydrolysis alcohol, preferably under vacuum at a bottoms temperature of less than 60° C., and
   obtaining an aqueous composition comprising N-vinylbenzylaminoalkyl-functional siloxanols and optionally salts of the protonated N-vinylbenzylaminoalkyl-functional siloxanol, wherein the composition comprises 1% to 70% by weight, in particular 30% to 60% by weight, of N-vinylbenzylaminoalkyl-functional siloxanols and/or salts of the protonated N-vinylbenzylaminoalkyl-functional siloxanols, and 30% to 99% by weight, in particular 40% to 70% by weight, of water based on the total composition of 100% by weight, in particular with a pH of 2 to 3.5.

The removing of the alcohol is preferably carried out by diluting the resulting composition with water, preferably 1 to 100 times the amount of water added for hydrolysis is added, preferably 10 to 30 times the amount of water is added, and the alcohol and hydrolysis alcohol are removed from the composition by distillation at reduced pressure under vacuum, preferably a rough vacuum, particularly preferably at a vacuum of less than 300 mbar (abs.), in particular at 100 to 250 mbar (abs.), and preferably at a bottoms temperature in the range from 20° C. to 65° C., especially 35 to 60° C., and optionally further water, preferably 0.5 to 100 times the amount of water used for the hydrolysis, preferably 0.5 to 10 times the amount of water, is added and the aqueous composition is obtained.

The step of removing the alcohol and the hydrolysis alcohol is preferably carried out by adding further water to remove at least a portion of the hydrolysis alcohol in this step; the amount of distillate is preferably replaced by an approximately equal amount of water.

According to the invention the process affords an aqueous composition whose content of i) free alcohol in the total composition is not more than 0.5% by weight, in particular not more than 0.25% by weight, particularly preferably not more than 0.1% by weight, in the total composition. The optional content ii) optionally of hydrolysable alkoxy groups is preferably less than 5% by weight in the total composition, in particular less than 0.1% by weight.

Furthermore, the adjustment of the pH of the composition is carried out by addition of an acid by preference to a pH of 2.7 to 4, preferably a pH of 2.7 to 3.75, particularly preferably a pH of 2.85 to 3.5, more preferably a pH of 3.0 plus/minus 0.5, plus/minus 0.25. It is more preferable when the pH of the obtained aqueous composition is optionally checked and adjusted to one of the abovementioned values of pH.

It is likewise preferable when the process comprises adding a vinyl halide that has been fractionally distilled, with addition of at least one stabilizer, such as tert-butylcatechol, before the addition, in particular immediately before the addition.

The reaction of the hydrolysis products and optionally of the condensation products of the hydrolysis products with vinylbenzyl halide may advantageously be carried out at a temperature in the range from 40 to 60° C. over 30 minutes to 3 hours with mixing.

According to a particularly preferred variant the process may be performed as recited below to obtain an aqueous composition having an alcohol content and optionally an hydrolysis alcohol content of less than 1.0% by weight, wherein in step 1 N-(2-aminoethyl)-3-aminopropyltrimethoxysilane and methanol or N-(2-aminoethyl)-3-aminopropyltriethoxysilane and ethanol are initially charged and with mixing 0.5 to 4.5 mol of water/mol of silicon, in particular 0.5 to 3.0 mol of water/mol of silicon, particularly preferably 1.0 to 3.0 mol of water/mol of silicon atoms, are added dropwise, and the mixture is mixed, preferably stirred, for 1 hour at 60° C., in step 2 the oligomeric siloxanols from step 1 are added in a molar ratio of N-(2-aminoethyl)-3-aminopropyltrimethoxysilane or N-(2-aminoethyl)-3-aminopropyltriethoxysilane to vinylbenzyl chloride from 1.0:0.60 to 1.0:1.15, preferably 1:0.99 to 1.01, in particular added and further reacted at a temperature in the range from 40° C. to 60° C., in step 3 the reaction product from step 2 is neutralized with acid, in particular with hydrochloric acid, preferably acidified and diluted with water, and then the methanol or ethanol is removed by distillation.

It is likewise preferable when the process is preferably performed with an aminoalkyl-functional alkoxysilane or a hydrolysis or condensation product of at least one aminoalkyl-functional alkoxysilane or a mixture comprising at least one aminoalkyl-functional alkoxysilane and a hydrolysis and/or condensation product of at least one aminoalkyl-functional alkoxysilane selected from the following aminoalkyl-functional alkoxysilanes, especially of general formula I: 3-aminopropyltrimethoxysilane, 3-aminopropyltriethoxysilane, 3-aminopropylmethyldimethoxysilane, 3-aminopropylmethyldiethoxysilane, 1-aminomethyltrimethoxysilane, 1-aminomethyltriethoxysilane, 2-aminoethyltrimethoxysilane, 2-aminoethyltriethoxysilane, 3-aminoisobutyltrimethoxysilane, 3-aminoisobutyltriethoxysilane, N-n-butyl-3-aminopropyltriethoxysilane, N-n-butyl-3-aminopropylmethyldiethoxysilane, N-n-butyl-3-aminopropyltrimethoxysilane, N-n-butyl-3-aminopropylmethyldimethoxysilane, N-n-butyl-1-aminomethyltriethoxysilane, N-n-butyl-1-aminomethylmethyldimethoxysilane, N-n-butyl-1-aminomethyltrimethoxysilane, N-n-butyl-1-aminomethylmethyltriethoxysilane, benzyl-3-aminopropyltrimethoxysilane, benzyl-3-aminopropyltriethoxysilane, benzyl-2-aminoethyl-3-aminopropyltrimethoxysilane, benzyl-2-aminoethyl-3-aminopropyltriethoxysilane, diaminoethylene-3-propyltrimethoxysilane, diaminoethylene-3-propyltriethoxysilane, triaminodiethylene-3-propyltrimethoxysilane, triaminodiethylene-3-propyltriethoxysilane, (2-aminoethylamino)ethyltrimethoxysilane, (2-aminoethylamino)ethyltriethoxysilane, (1-aminoethylamino)methyltrimethoxysilane and (1-aminoethylamino)methyltriethoxysilane, preference being given especially to di- and/or triaminoalkoxysilanes. Particular preference is given to diaminoethylene-3-propyltrimethoxysilane, diaminoethylene-3-propyltriethoxysilane, triaminodiethylene-3-propyltrimethoxysilane, triaminodiethylene-3-propyltriethoxysilane.

The invention likewise provides for the use of a composition or of a process product as an adhesion promoter for use on inorganic and organic substrates, as an adhesion promoter between inorganic and organic surfaces, for coating inorganic particles for a crosslinking with monomers in the production of polymers filled with inorganic particles, in the reinforcing of organic polymers with inorganic fillers, in the coating of inorganic surfaces or organic polymers and in fibre-reinforced polymers as adhesion promoters between inorganic fibres and organic polymers.

Inorganic substrates or surfaces are to be understood as meaning concrete, brick, mortar, stone, mineral plaster, metal, alloys, hybrid materials and glass, and organic surfaces are to be understood as meaning polymers, such as polymers of synthetic monomers, such as acrylates, styrene, polyamide, PEEK etc., and also substrates or surfaces containing wood, paper, cellulose and lignocellulose.

The present invention is elucidated in more detail by the examples which follow, without limiting the subject matter.

EXAMPLES

Determination of Molecular Weight:

Molar masses/molecular weights and also molar mass distributions may be determined by gel permeation chromatography (GPC). The GPC analysis method is described in detail in references including "Modern Size-Exclusion Liquid Chromatography", Andre Striegel et al., Wiley & Sons, 2nd edn., 2009. Divinyltetramethoxydisiloxane, for example, may be used as a standard to calibrate the method for siloxane analyses.

Determination of $SiO_2$ Content: Crucible Method:

The $SiO_2$ content is determined by acid digestion with concentrated sulfuric acid and subsequent evaporation by fluorination.

GC Analysis:

In the context of GC standard analysis well known to those skilled in the art, the alcohol and hydrolysis alcohol content are determined using a suitable calibration and optionally an internal standard (for example nonane).

Example 1: Reaction Product of DAMO Oligomer (3.0 mol of $H_2O$/mol of Si)/VBC (Vinylbenzyl Chloride) and Water Apparatus: 2000 ml four-necked flask, dropping funnel, distillation bridge, intensive cooler, KPG stirrer, oil bath with temperature control, vacuum pump 126.3 g (0.568 mol) of DAMO ((2-aminoethyl)aminopropyltrimethoxysilane) and 62.0 g of methanol were initially charged in a 2000 ml four-necked flask. The bottoms temperature increased from 23° C. to 34° C. 30.7 g (1.705 mol) of DM (demineralized) water were added over three minutes. The bottoms temperature increased to 49° C. The mixture was stirred for a further hour at a bottoms temperature of 50° C. Subsequently, at a bottoms temperature of 55° C. to 58° C., 73.7 g (0.483 mol) of vinylbenzyl chloride (isomer mixture) were added over 2.4 h and the mixture was stirred for a further two hours at this temperature. The bottoms were subsequently diluted with 207.3 g of methanol. At a bottoms temperature of 20° C., addition of conc. hydrochloric acid (37%) was commenced. 60.9 g (0.618 mol) of concentrated hydrochloric acid were added over three minutes. The bottoms temperature increased to 37° C. The clear bottoms were then diluted with 578.9 g of DM water and methanol and hydrolysis methanol were removed by distillation at an absolute pressure of 200 mbar to 170 mbar and a bottoms temperature of 42° C. to 55° C. Altogether 660.9 g of distillate were removed and a further 24 g of DM water were added. 502.2 g of yellow, clear, low-viscosity bottoms product were obtained. The product remained clear and low-viscosity after an accelerated storage test (three weeks at 60° C., recirculating drying cabinet).
Analyses:

TABLE 1

| Determination | Result | Method |
|---|---|---|
| Initial | | |
| free methanol [% w/w] | 0.1 | see above |
| SiO$_2$ content | 6.8 | see above |
| pH | 2.7 | DIN EN ISO 10523 |
| colour number [Gardner] | 8 | ISO 4630 |
| refractive index | 1.4190 | DIN 51423 |
| viscosity (20° C.) [mPas] | 137 | DIN 53015 |
| density (20° C.) [g/cm$^3$] | 1.100 | DIN 51757 |
| turbidity [FNU] | 2.9 | ISO 7027 |
| 3 weeks of storage at 60° C. | | |
| viscosity (20° C.) [mPas] | 257 | DIN 53015 |
| colour number [Gardner] | 9 | ISO 7027 |

Example 1 Molar Mass Distribution (Before Storage)

GPC column: PSS Novema Max. precolumn, column 2 and 3: PSS Movema Mac 100A, detector 1: Agilent RID G1362A, eluent: water, flow rate: 1 ml/Min, temp: 40° C.

TABLE 2

| GPC | |
|---|---|
| M$_n$ | 2.289 · 10$^3$ g/mol |
| M$_w$ | 1.141 · 10$^4$ g/mol |
| M$_z$ | 2.011 · 10$^4$ g/mol |
| D | 4.98 |
| M$_p$ | 1.202 · 10$^4$ g/mol |

Example 2: Reaction Product of DAMO Oligomer (1.5 mol of H$_2$O/mol of Si)/VBC (Vinylbenzyl Chloride) and Water Apparatus: 1000 ml four-necked flask, dropping funnel, distillation bridge, intensive cooler, KPG stirrer, oil bath with temperature control, vacuum pump 94.6 g (0.425 mol) of DAMO ((2-aminoethyl)aminopropyltrimethoxysilane) and 51.0 g of methanol were initially charged in a 1000 ml four-necked flask. The bottoms temperature increased from 23° C. to 34° C. A mixture of 11.5 g (0.638 mol) of DM water and 11.5 g of methanol was added over three minutes. The bottoms temperature increased to 49° C. The mixture was stirred for a further hour at a bottoms temperature of 50° C. Subsequently, at a bottoms temperature of 55° C. to 58° C., 55.4 g (0.363 mol) of vinylbenzyl chloride (isomer mixture) were added over 0.5 h and the mixture was stirred for a further two hours at this temperature. The bottoms were subsequently diluted with 26.1 g of methanol. At a bottoms temperature of 20° C., addition of conc. hydrochloric acid (37%) was commenced. 45.7 g (0.464 mol) of concentrated hydrochloric acid were added over four minutes. The bottoms temperature increased to 36° C. The clear bottoms were then diluted with 373.8 g of DM water and the hydrolysis methanol was removed by distillation at an absolute pressure of 200 mbar to 170 mbar and a bottoms temperature of 44° C. to 56° C. Altogether 291.8 g of distillate were removed and a further 34.8 g of DM water were added. 375.0 g of yellow, clear, low-viscosity bottoms product were obtained. The product remained clear and low-viscosity after an accelerated storage test (three weeks at 60° C.).
Analyses:

TABLE 3

| Determination | Result | Method |
|---|---|---|
| Initial | | |
| free methanol [% w/w] | 0.2 | see above |
| SiO$_2$ content | 6.9 | see above |
| pH | 2.7 | DIN EN ISO 10523 |
| colour number [Gardner] | 8 | ISO 4630 |
| refractive index | 1.4205 | DIN 51423 |
| viscosity (20° C.) [mPas] | 207 | DIN 53015 |
| density (20° C.) [g/cm$^3$] | 1.102 | DIN 51757 |
| turbidity [FNU] | 1.9 | ISO 7027 |
| 3 weeks of storage at 60° C. | | |
| viscosity (20° C.) [mPas] | 217 | DIN 53015 |
| colour number [Gardner] | 8 | ISO 7027 |

Example 2 Molar Mass Distribution (Before Storage)

GPC column: PSS Novema Max. precolumn, column 2 and 3: PSS Movema Mac 100A, detector 1: Agilent RID G1362A, eluent: water, flow rate: 1 ml/Min, temp: 40° C.

TABLE 4

| GPC | |
|---|---|
| M$_n$ | 8.886 · 10$^3$ g/mol |
| M$_w$ | 1.104 · 10$^4$ g/mol |
| M$_z$ | 1.717 · 10$^4$ g/mol |
| D | 1.24 |
| M$_p$ | 1.200 · 10$^4$ g/mol |

Comparative Example 1: Aqueous Hydrolysate of (N-vinylbenzyl-2-aminoethyl)aminopropyltrimethoxysilane Hydrochloride Apparatus: 2000 ml four-necked flask, dropping funnel, distillation bridge, intensive cooler, KPG stirrer, oil bath with temperature control, vacuum pump 499.5 g (0.605 mol) of (N-vinylbenzyl-2-aminoethyl) aminopropyltrimethoxysilane hydrochloride, 42% in methanol, were initially charged in a 2000 ml four-necked flask. 58.7 g of concentrated hydrochloric acid, 37% (0.645 mol HCL r.S./2.22 mol H$_2$O), were added over 0.5 h. The bottoms temperature increased to 45° C. At an absolute pressure of 300 mbar to 130 mbar and a bottoms temperature of about 60° C. a total of 737.8 g of distillate were removed. 713.8 g of DM water were added during the distillation. 507.7 g of clear, yellow/reddish, low-viscosity product were obtained.

The product had solidified after 1 d of storage at 60° C. (in a recirculating drying cabinet).
Analyses:

TABLE 5

| | Initial | |
|---|---|---|
| Determination | Result | Method |
| free methanol [% w/w] | <0.1 | see above |
| SiO$_2$ content | 6.9 | see above |
| pH | 2.8 | DIN EN ISO 10523 |
| colour number [Gardner] | 9 | ISO 4630 |
| viscosity (20° C.) [mPas] | | DIN 53015 |
| density (20° C.) [g/cm$^3$] | 1.108 | DIN 51757 |
| turbidity [FNU][1)] | 12.6 | ISO 7027 |

[1)]measurement after 5 d of RT storage

The invention claimed is:

1. An aqueous composition comprising N-vinylbenzylaminoalkyl-functional siloxanols and, optionally, protonated salts of the N-vinylbenzylaminoalkyl-functional siloxanols which are derived from a reaction
of hydrolysis products and, optionally, condensation products of hydrolysis products, of at least one aminoalkyl-functional alkoxysilane or a mixture of aminoalkyl-functional alkoxysilanes with vinylbenzyl halide,
wherein the composition comprises
1% to 70% by weight of the N-vinylbenzylaminoalkyl-functional siloxanols and/or the protonated salts of the N-vinylbenzylaminoalkyl-functional siloxanols, and
30% to 99% by weight of water, based on a total weight of the composition; and
wherein the composition has an acidic pH.

2. The composition according to claim 1, wherein the composition
has a pH of less than 7.0, and/or
contains not less than 0.1% by weight of acid selected from the group consisting of inorganic acid, organic acid, and a mixture thereof,
wherein a content of N-vinylbenzylaminoalkyl-functional siloxanol, water and acid does not exceed 100% by weight.

3. The composition according to claim 2, wherein the acid is selected from the group consisting of hydrochloric acid, formic acid, acetic acid, oxalic acid, and fumaric acid.

4. The composition according to claim 2,
wherein the composition comprises
per mol of nitrogen atoms of the siloxanols, 0.2 to 1.5 mol of protons (hydrons) and anions of halides and, optionally, of the acid.

5. The composition according to claim 1, wherein a weight average molecular weight (Mw) of the N-vinylbenzylaminoalkyl-functional siloxanols and/or the protonated salts of the N-vinylbenzylaminoalkyl-functional siloxanols is not less than 1,000 g/mol, and/or
wherein a number average molecular weight (Mn) of the N-vinylbenzylaminoalkyl-functional siloxanols and/or the protonated salts of the N-vinylbenzylaminoalkyl-functional siloxanols is not less than 700 g/mol.

6. The composition according to claim 1, wherein a content of
free alcohol in the composition is not more than 0.5% by weight, and
if present, hydrolysable alkoxy groups of less than 5% by weight.

7. The composition according to claim 1, wherein the at least one aminoalkyl-functional alkoxysilane corresponds to formula (I)

$$(R^1O)_{3-a-b}(R^2)_a Si(B)_{1+b} \quad (I),$$

wherein in formula (I)
R$^1$ independently represents a linear, branched, or cyclic alkyl group having 1 to 8 carbon atoms,
R$^2$ independently represents a linear, branched, or cyclic alkyl group having 1 to 8 carbon atoms,
a is independently 0 or 1, and
b is independently 0, 1, or 2, and
wherein group B in formula (I) independently corresponds to a group of formula (II)

$$-(CH_2)_c-[(NH)(CH_2)_d]_e[(NH)](CH_2)_f]_g NH_{(2-h)}R^3{}_h \quad (II)$$

wherein in formula (II)
R$^3$ independently represents a linear, branched, or cyclic alkyl, aryl, or
alkylaryl group having 1 to 8 carbon atoms;
c is independently selected from 1, 2, 3, 4, 5, and 6;
d is independently selected from 1, 2, 3, 4, 5, and 6;
e is independently selected from 0, 1, 2, 3, 4, 5, and 6;
f is independently selected from 1, 2, 3, 4, 5, and 6;
g is independently selected from 0, 1, 2, 3, 4, 5, and 6; and
h is independently 0 or 1; or
wherein group B in formula (I) corresponds to a group of formula (III)

$$-(CH_2)_j-NH_{2-p}(CH_2-CH_2-NH_2)_p \quad (III)$$

where j=1, 2, or 3; and p=0, 1, or 2.

8. The composition according to claim 7, wherein the at least one aminoalkyl-functional alkoxysilane corresponds to formula (I)

$$(R^1O)_{3-a-b}(R^2)_a Si(B)_{1+b} \quad (I),$$

and group B in formula (I) corresponds to the group of formula (III)

$$-(CH_2)_3-NH-CH_2-CH_2-NH_2 \quad (III).$$

9. The composition according to claim 1, wherein a weight average molecular weight (Mw) of the N-vinylbenzylaminoalkyl-functional siloxanols and/or the protonated salts of the N-vinylbenzylaminoalkyl-functional siloxanols is not less than 1,000 g/mol and not more than 100,000 g/mol, and/or
wherein a number average molecular weight (Mn) of the N-vinylbenzylaminoalkyl-functional siloxanols and/or the protonated salts of the N-vinylbenzylaminoalkyl-functional siloxanols is not less than 700 g/mol and not more than 100,000 g/mol.

10. The composition according to claim 9, wherein the weight average molecular weight (Mw) of the N-vinylbenzylaminoalkyl-functional siloxanols and/or the protonated salts of the N-vinylbenzylaminoalkyl-functional siloxanols is not less than 10,000 g/mol and not more than 50,000 g/mol, and/or
wherein the number average molecular weight (Mn) of the N-vinylbenzylaminoalkyl-functional siloxanols and/or the protonated salts of the N-vinylbenzylaminoalkyl-functional siloxanols is not less than 1,500 g/mol and not more than 50,000 g/mol.

11. The composition according to claim 1, wherein the composition has an alcohol content of <1.0% by weight.

12. A process for producing the composition according to claim 1, comprising:
  initially charging the at least one aminoalkyl-functional alkoxysilane or the mixture of aminoalkyl-functional alkoxysilanes, which is optionally an alcoholic composition,
  adding 0.5 to 4.5 mol of water/mol of silicon atoms,
  optionally, maintaining a temperature in the range from 40 to 65° C. with mixing,
  obtaining a composition comprising hydrolysis products and, optionally, condensation products of the hydrolysis products, of the at least one aminoalkyl-functional alkoxysilane and hydrolysis alcohol,
  reacting the hydrolysis products and the condensation products of the hydrolysis products, if present, with vinylbenzyl halide, wherein the vinylbenzyl halide is added in a molar ratio of 1.0: 0.60 to 1.0: 1.15, based on the aminoalkyl-functional alkoxysilanes or the mixture of aminoalkyl-functional alkoxysilanes, and, optionally, adding the vinylbenzyl halide at a temperature in the range from 40 to 60° C.,
  obtaining a composition of the N-vinylbenzylaminoalkyl-functional siloxanols and, optionally, the protonated salts of the N-vinylbenzylaminoalkyl-functional siloxanols,
  adjusting the pH of the composition by adding acid selected from the group consisting of inorganic acid, organic acid, and a mixture thereof,
  adding water,
  removing alcohol and the hydrolysis alcohol, and
  obtaining the aqueous composition comprising N-vinylbenzylaminoalkyl-functional siloxanols and, optionally, protonated salts of the N-vinylbenzylaminoalkyl-functional siloxanols, wherein the composition has an acidic pH.

13. The process according to claim 12, wherein
  the adding water comprises adding a defined amount of water,
  the removing the alcohol and the hydrolysis alcohol comprises a distillative removal of the alcohol and the hydrolysis alcohol, and
  wherein the aqueous composition comprising N-vinylbenzylaminoalkyl-functional siloxanols and, optionally, protonated salts of the N-vinylbenzylaminoalkyl-functional siloxanols, comprises
  1% to 70% by weight of the N-vinylbenzylaminoalkyl-functional siloxanols and/or the protonated salts of the N-vinylbenzylaminoalkyl-functional siloxanols, and 30% to 99% by weight of water, based on a total weight of the composition.

14. The process according to claim 13, wherein the adding water comprises adding a defined amount of distilled water, and/or
  wherein the removing the alcohol and the hydrolysis alcohol comprises a distillative removal of the alcohol and the hydrolysis alcohol under vacuum at a bottoms temperature of less than 60° C.

15. The process according to claim 12, wherein the aqueous composition has a content of
  free alcohol of not more than 0.5% by weight, and
  if present, hydrolysable alkoxy groups of less than 5% by weight.

16. The process according to claim 12, wherein the initially charging the at least one aminoalkyl-functional alkoxysilane or the mixture of aminoalkyl-functional alkoxysilanes as an alcoholic composition having a weight ratio of amino-functional alkoxysilane to alcohol of 80: 20 to 30: 70.

17. The process according to claim 16, wherein the alcohol is ethanol or methanol.

18. The process according to claim 12, wherein during adjustment of the pH of the composition by addition of an acid, a pH of 2.7 to 4 is established.

19. The process according to claim 12, wherein the vinylbenzyl halide is vinylbenzyl chloride.

20. A method, comprising:
  applying the composition according to claim 1 as an adhesion promoter on inorganic and organic substrates, as an adhesion promoter between inorganic and organic surfaces, for coating inorganic particles for crosslinking with monomers in production of polymers filled with inorganic particles, for reinforcing of organic polymers with inorganic fillers, for coating of inorganic surfaces or organic polymers, and in fibre-reinforced polymers as an adhesion promoter between inorganic fibres and organic polymers.

* * * * *